March 10, 1970     C. R. KILLIAN     3,500,028
AUTOMATIC CHROMATOGRAPHY SYSTEM
Filed March 10, 1965     4 Sheets-Sheet 1

INVENTOR
CHARLES R. KILLIAN
BY Browne, Schuyler & Beveridge
ATTORNEYS

March 10, 1970  C. R. KILLIAN  3,500,028
AUTOMATIC CHROMATOGRAPHY SYSTEM
Filed March 10, 1965  4 Sheets-Sheet 2

FIG. 2

INVENTOR
CHARLES R. KILLIAN
BY Browne, Schuyler & Beveridge
ATTORNEYS

March 10, 1970 C. R. KILLIAN 3,500,028
AUTOMATIC CHROMATOGRAPHY SYSTEM
Filed March 10, 1965 4 Sheets-Sheet 4

INVENTOR
CHARLES R. KILLIAN
BY Browne, Schuyler & Beveridge
ATTORNEYS

United States Patent Office 3,500,028
Patented Mar. 10, 1970

3,500,028
AUTOMATIC CHROMATOGRAPHY SYSTEM
Charles R. Killian, Baton Rouge, La., assignor to Foster Grant Co., Inc., Leominster, Mass., a corporation of Delaware
Filed Mar. 10, 1965, Ser. No. 438,609
Int. Cl. G06g 7/18, 7/48; G06f 15/20
U.S. Cl. 235—183
23 Claims

ABSTRACT OF THE DISCLOSURE

This invention adapts elution chromatography where isomers are present to automatic control of a manufacturing process in which process results, concentrations, and other factors must be continuously measured and variations corrected during a run by the use of chromatographic apparatus feeding in succession a number of signal channels according to the number of components in samples taken from the monitored stages of the process. Conventional chromatography takes too long for automatic process control when isomers are present and peak readings are not reliably accurate. A method of shortening the elution time for the successive components in the several stages employs detection of a minimum in a chromatographic signal occurring between successive component elutions and shifts the integration from one channel to another in accordance with the predominant component then eluted. Elution by a carrier gas is speeded up according to this invention to provide sometimes overlapping component signals while separating component integration signals by result rather than by time. A minimum detector utilizes change of sign responsive apparatus to switch integration control between registering channels which are otherwise controlled to a time schedule. Standardization of samples injected for elution is effected by integrating a signal representative of all sample components throughout the time of elution and comparing this integrated total with a standard voltage value while at the same time attenuating signals presentative of the several components to the same time constant.

---

It is known in the art of chromatography to provide single or multiple columns packed or internally coated with an adsorbent material selectively adsorbing in sequence the components of a gas mixture which is thereafter eluted by a carrier gas in inverse relation to the adsorption whereby measurements can be made of the components in sequence. It is also known to provide certain types of compensation for sample size variations or to provide various sample size control devices so as to decrease the effect of sample size variations on the duration and peak height of a chromatogram. Known methods of controlling sample size or compensation therefor are not altogether satisfactory since solid particles contained in, or deposits from, the fluid prevent the operation of the sampling device to the required accuracy. For other reasons, elution time may vary considerably even with a perfect sample size, and a satisfactory means of recordably determining the amount of a particular constituent of the mixture has not been available. Such effects make peak height readings inaccurate.

It is also known to integrate a signal derived from the passage of a particular component of a mixture over a set time programmed by a clock and control device so as to allot a standardized time for measurement of a particular anticipated peak in a chromatogram. However, time required for elution of each component changes with changing quantities and it has not been possible to automatically determine when a particular constituent has been fully eluted and thus integrated signals are of overlapping times or incorrectly allotted times. The resulting integral is not of a pure constituent. It is known to increase the time of elution so that peaks are so well separated in time as to permit full separation at considerably increased analysis time. It has not been heretofore possible to provide an accurate determination of the minimum point between two peaks in a chromatogram except when elution is fully effected by extending the time so that all peaks are separated by a zero signal broad enough to include the maximum time changes in the commencement and ending of an elution period for such a constituent if the signal integral is taken as the measure of the quantity. Accordingly, one may measure the heights of individual peaks corresponding to the different constituents, or may store values corresponding to such peaks, with readout of such peak values for recording purposes. However, these techniques are not satisfactory when isomers are present such that double peaks may occur, or where small but important constituents may result in small peaks which occur along the side of the curve corresponding to a larger peak for a more plentiful constituent. Heretofore, it has been necessary either to combine isomer peaks into one single peak by shortening elution time for height measurement but this prevents analysis where it is desired to extend the time of elution to fully separate closely adjacent small peaks. Consequently, it may not always be possible to determine when one constituent has passed and another begins because of overlap in the time of elution for these constituents, particularly where composition of the mixture varies between samples or between process steps.

It is accordingly an object of the present invention to provide a method of integrating a signal corresponding to the quantity of particular constituents in a fluid mixture eluted from a chromatograph column, regardless of the time of commencement or ending thereof.

Another object of the invention is to provide a method of standardizing signals regardless of changes of sample size comparing a total sample signal integration to a signal integration for each constituent.

Another object is to provide means for analyzing and recording fluid mixtures from a number of process points in the same apparatus, standardizing the outputs and recording the analysis in succession in a comprehensive manner for presentation.

A further object of the invention is to provide a method of determining the division point between two constituents of an eluted mixture without requiring the return of the chromatograph signal output to zero.

A still further object of the invention is to provide a minimum signal detector for a chromatograph, and to control the time of beginning and ending of an analysis interval in a programmed sequence in which sequential portions are under control of the actual elution time for the constituents themselves.

These and other objects of the invention will be better understood as the description proceeds in connection with the drawings in which.

To achieve the objects of this invention, applicant employs conventional chromatographic apparatus and stream selection techniques with a standard recorder, controlled somewhat differently. Basically, those variations in output signal dependent upon sample size are eliminated since all signals are stored and reduced to comparable scale determined by a fixed reference voltage to provide readout of stored signals on the same scale regardless of sample size, stream source or elution rate. Since variations in sample size cannot be avoided nor the variation of component quantities nor their consequence in changing the elution interval, applicant supplies an automatic means for finding the instant of the minimum signal received between two overlapping elution signals in a novel detector circuit, used to control the commencement and/or ending of the storage of a signal corresponding to each of the constituent parts of fluid mixture in each stream. Use of standardization of signal and control by the time of occurrence of a signal minimum thus avoids dependence on sample size changes over a wide range, and permits greatly speeded analysis since intervals between measured components need not be so prolonged as to provide for time-controlled initiation of storage and/or readout. Thus, the time for complete analysis of a multistream process is kept below one hour for one chemical manufacturing process whereas in prior apparatus a time approximately two and one-half to three hours was required for results of lesser utility.

Figure 1:
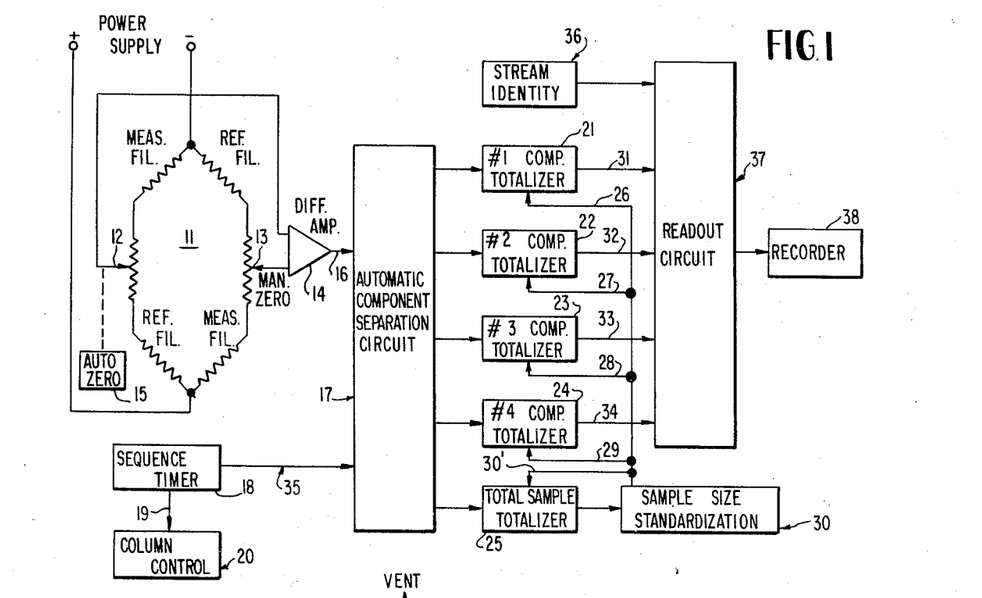
FIG. 1 is a block diagram of a recording system according to this invention.

Referring now to FIG. 1, the recording and control circuit is shown generally as comprising a four-element bridge 11 having output terminals adjustable for proper balancing to provide zero output signal when no fluid is eluted. Leads from variable impedances 12 and 13 extend to a differential amplifier 14. An automatic zero adjusting device 15 of conventional type not herein described in detail is preferably included. Amplifier 14 is a conventional high gain differential amplifier in which two input signals are compared from which an output is taken along line 16 at a low source impedance whereby an output signal voltage is kept proportional to elution product regardless of variations in the load impedance of the following circuits. Automatic component separation circuit means is shown generally at 17 which receives signals via line 16 and is further controlled by a sequence timer shown generally at 18 via line 35 for initiating and partially controlling switching operations in circuit 17. Operation of the chromatograph column, shown generally at 20, is under control of a control circuit 19 timed by sequence timer 18.

Signal component separation circuit 17 provides switched output to one of a number of signal integrators shown at 21, 22, 23 and 24, and at all times to total signal integrator 25. The function of each integrator is to totalize the signal from the separation circuit corresponding to an interval of time of expected elution, modified to an automatically determined period of time which corresponds to a particular component or constituent part of the fluid mixture being then eluted and measured in the fluid detector device 11.

Sample size variations cannot be avoided under many circumstances of operation as where miniature sampler devices and their control valves are subject to encrustation by various materials passing through the line, especially where polymerization and deposit is continuously taking place, or where excess free particles such as sulphur may clog the sample measuring device thus to change the sample size obtained from sample-to-sample.

Figures 6, 6A:
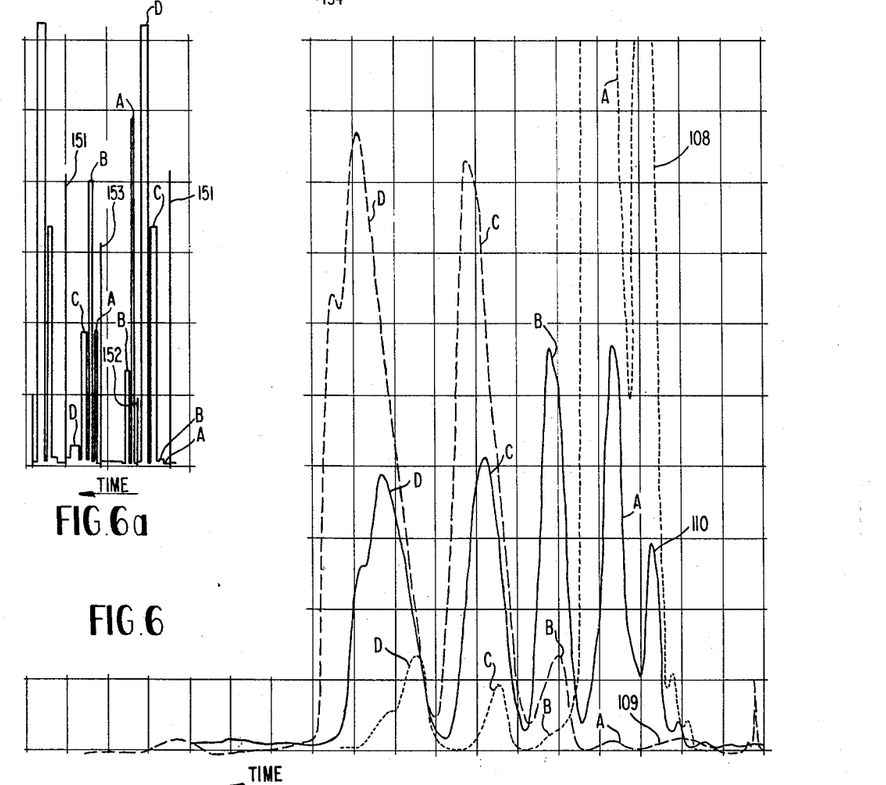
FIG. 6 is an illustrative drawing of three chromatograms on a typical time scale for samples from the same process differing in the relative quantity of each constituent with consequent variation in commencement and termination of the elution of each constituent.
FIG. 6a is a bar graph representation of the relative amounts of each of the components in three different streams sequentially analyzed, the signal being stored and readout with stream identification.

A standardization circuit generally shown at 30 has connections at 26, 27, 28, 29, and 30'. Upon completion of standardization of the signal voltages stored in the integrators 21–25, a readout circuit is operated to pass voltage integral signals from these integrators via lines 31–34 to the readout circuit 37 and thence to recorder 38. At the same time, or at the commencement of the stream analysis, a stream identity marker shown generally at 36 is actuated to provide a key mark on the record sheet via readout circuit 37 such that cyclic component readout for each stream is indicated in bar height representations identified in each stream by a characteristic marker such as a vertical line of predetermined height, as illustrated in FIG. 6a. The components are preferably shown as bar height presentations of individually discrete widths.

Figures 1A, 3, 4:
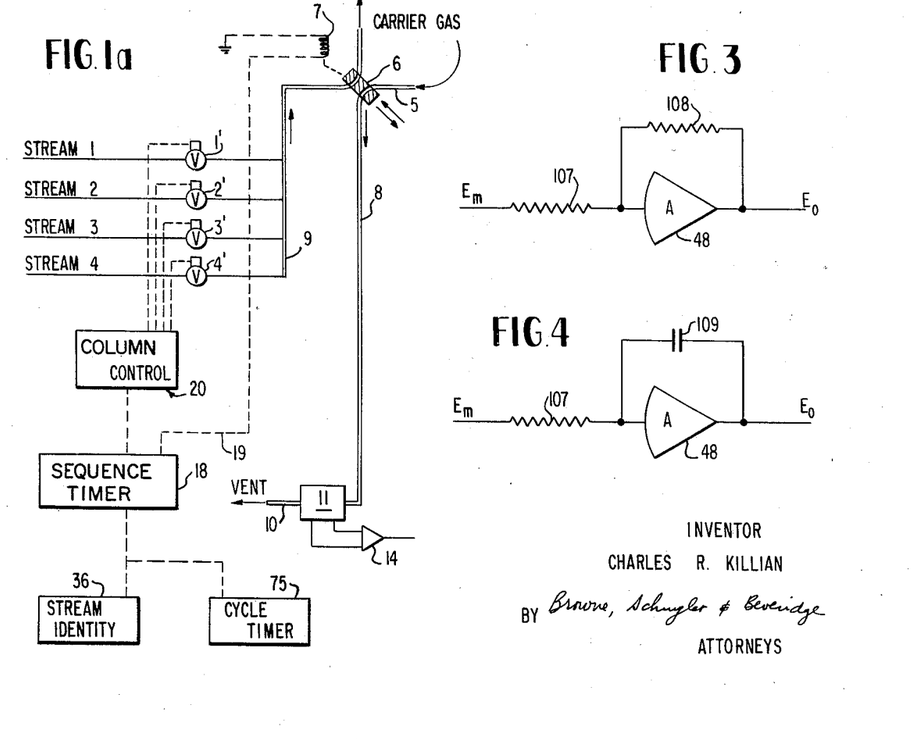
FIG. 1a is a schematic diagram of a multistream chromatograph using the recording system of FIG. 1 sequentially.
FIG. 3 is a schematic diagram of an operational amplifier included in FIG. 2.
FIG. 4 is a schematic diagram of an operational amplifier connected as a signal integrator.

FIG. 1a illustrates schematically a typical chromatograph apparatus for the analysis of four streams in sequence indicated at 1, 2, 3 and 4 and for which individual sampling valves 1', 2', 3', and 4' connect samples in selected successive order to manifold 9, and through sample valve 6 to vent. Upon operation of sample valve 6 via operating mechanism 7 a quantity of fluid to be analyzed is trapped by valve 6 and caused to be injected into the carrier gas stream 5 which transports the fluid to the selective absorber material in column 8, and is exhausted at vent 10. Conventionally, other means not shown is provided for back flushing of column 8 with carrier gas or another inert gas, according to circumstances. Component detector 11 produces a pair of output signals which are compared in difference amplifier 14. Sequence timer 18 operates through a conventional stream control, sequence control shown generally at 20, and produces a sampling at one or another of the stream sampling valves, at the same time controlling the operation of valve 6 through a suitable electrical circuit 7. Timer 18 connects also to a stream identity marking device shown generally at 36 and controls the operation of a cycle timer 75 later to be described.

Figure 2:
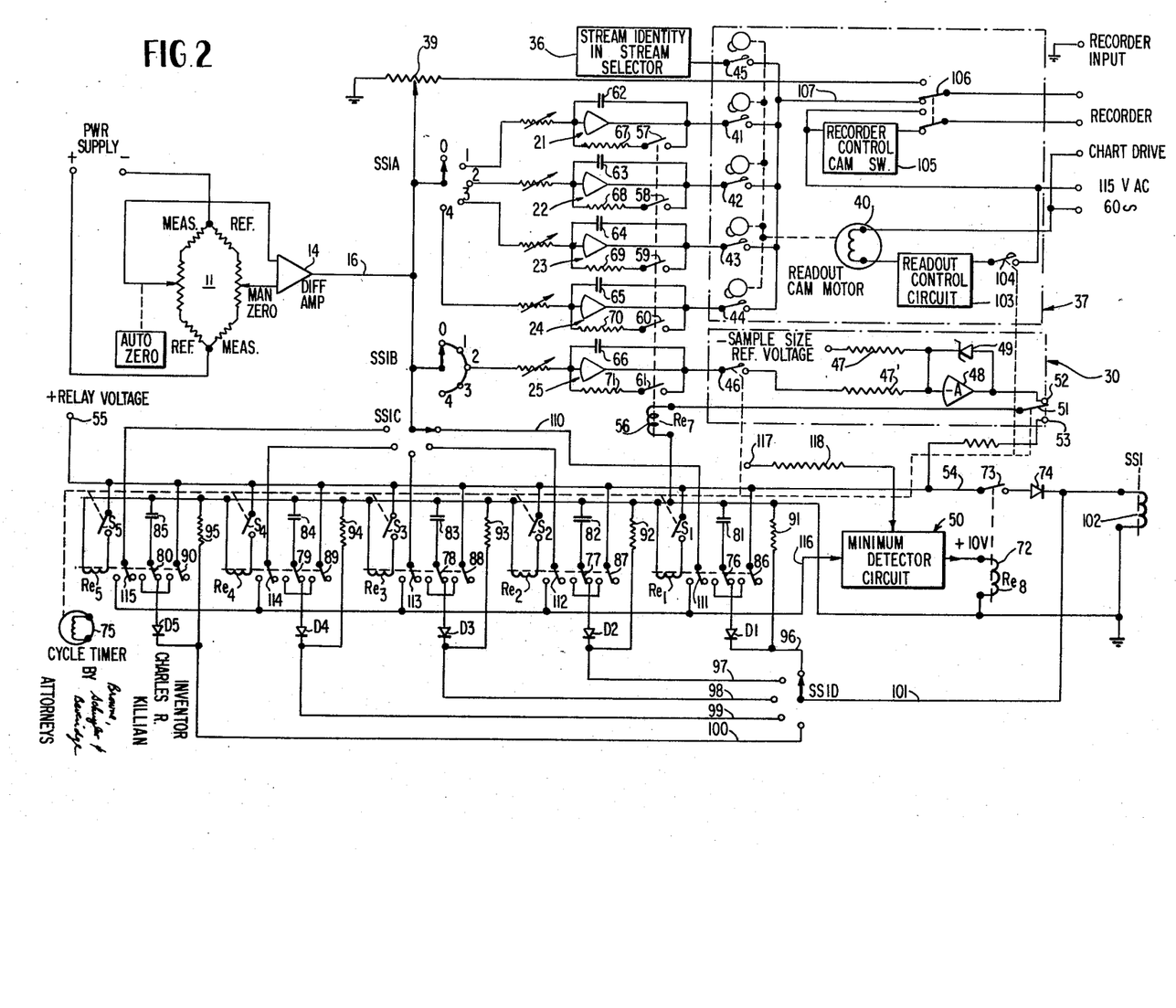
FIG. 2 is a schematic diagram of the signal processing portions of the system of FIG. 1.

A schematic diagram as in FIG. 2 shows essential features of a system by which elution time is speeded up and the resulting data is sufficiently standardized to serve as a basis for the control of a manufacturing process and analysis of resulting concentrations and products needed in effective process control. Signal separation circuit 17 is shown in FIG. 2 as comprising generally integrators 21–25 fed from respective ones of the terminals on a conventional stepping switch SS1 having banks SS1A, SS1B, SS1C and SS1D. Lead 16 is connected at all times to integrator 25 and is connected in succession to integrators 21, 22, 23 and 24. At the same time the signal in lead 16 is taken by way of SS1C to a minimum detector circuit shown generally at 50, and at suitable intervals the integrated total sample signal goes to a sample standardization circuit shown generally at 30. For recording control purposes attenuator 39 is conventionally connected for adjusting the magnitude of the signal to be recorded. Optionally, each of the integrators has in the input or the output circuit thereof a further attenuator for adjustment of stored signal attenuation so that each integrator has similar response or a predetermined multiplication factor relative to an input signal from line 16 via one of the contacts of SS1A or SS1B.

At suitable intervals controlled by cycle timer 75 readout cam motor 40 may be operated to provide successive readouts of signal stored on the integrators after standardization by circuit 30, employing for the purpose rotary cams 41, 42, 43 and 44 while stream identify markings are provided via switch 45 also controlled by readout motor 40.

In addition to the signal attenuators for equalizing response of the various parts of the measurement apparatus having different sensitivity and for multiplying integrated signal outputs by a factor to properly utilize the full scale of a recorder, it is necessary to reduce variables affecting all detected output voltages, as by sample size, temperature and other factors affecting elution rate and signal magnitude at detector 11.

Improved means for providing like sensitivity and output for the various streams and constituents measured in the elution chromatograph for storage and ultimate readout in graph form is illustrated in FIG. 2. A voltage comparator typical sample standardization circuit 30 is actuated at suitable readout times, as when elution of a sample is completed, under control of sequence timer 18 by way of a suitable control circuit 103 is suitably interconnected with cycle timer 75 to close switch 46 when the readout cam motor 40 is placed in operation Sequence timer 18 includes timer operations not herein described in detail and controls cycle timer 75 which serves to limit the time for search for a minimum signal corresponding to each component, by periodically advancing switch SS1. Resetting of SS1 is not described in detail since a number of conventional circuits for the purpose are well known, such as in automatic homing of stepping switches after the final sequenced step. A voltage supply illustratively at —15 v. D.C., remains permanently connected to resistor 47 and to a like resistor 47' at a common connection at the input to direct coupled amplifier 48. Amplifier 48 is of the conventional operational amplifier type but modified in having an output which is connected by Zener diode 49 to the input thereto. As herein used, an operational amplifier has very high gain and produces an output voltage of inverted polarity. When switch 46 is open, a negative voltage is applied at the input of amplifier 48 through resistor 47. Zener diode 49 is poled to prevent the positive output of amplifier 48 from raising sufficiently operate relay 56, being for example +.2 volt. When switch 46 is closed, the voltage stored on capacitor 66 is applied at resistor 47' to produce a net positive voltage at the input to amplifier 48. Resistors 47 and 47' are suitably adjusted in conjunction with the reference voltage to cause amplifier 48 to operate at the minimum voltage applied to switch 46 which corresponds to the smallest sample signal integral which may be anticipated for storage on capacitor 66. Instantly upon application of a positive voltage at the junction of 47, 47', the output voltage from 48 becomes negative to the limit of the breakdown voltage of the Zener diode 49, e.g., 10 volts, and output is applied through cam switch 51 by way of terminal 52 for the energization of relay coil 56. As 56 is actuated, switches 57–61 operate to cause discharge of condensers 62–66 through resistors 67–71, respectively. Capacitors 62–66 and resistors 67–71 are alike and therefore produce discharge of the capacitors along identical voltage decay curves thereby to provide like fractions of attenuation at any instant regardless of the magnitude of charge from sample to sample. When capacitor 66 has decayed sufficiently to provide a preselected voltage as applied to resistor 47, the net input voltage to amplifier 48 falls to zero, and the output thereof also falls to zero, causing switches 57–61 to open thereby terminating the discharge of capacitors 62–66 through their respective discharge paths. Whenever the sample size standardization circuit is operated by closing switch 46 the voltage on capacitor 66 is reduced to a predetermined reference value in each of the other capacitors, and integrators 21–24 are likewise reduced by the same fraction, and the result is a voltage stored at capacitor 66 which is the same regardless of the magnitude of the input signal from amplifier 14 as the sample size changes. Stored voltage will be different in each of the integrators and will be reduced by like fractions equal to that fraction of the total signal reduction at capacitor 66. Integrators 21–25 are each operated according to the actual signals received but are corrected proportionally to a reference value for the total stream integral. In a practical system it is necessary to decay the residual signal on each of the integrators prior to the selection of a new sample for analysis. Accordingly, switch 51 has a third pole 53 connected by lead 54 to a relay voltage supply 55, which may conveniently be 24 volts D.C. Upon operation of the readout control circuit and the recording of the several voltages on the integrators 21–24, cam switch 51 is operated to the position contacting pole 53, and relay 56 is again operated to complete the discharge of the capacitors in the integrators prior to a further stream analysis.

It may be noted that operational amplifiers are herein shown as two terminal devices, according to conventional showings. Each such amplifier also has grounded input and output terminals, generally understood and a connected power supply. With the feedback circuit the amplifier may serve as a current sink. Thus it is current which is balanced in resistors 47 and 47' and a change in sign of sum of opposite currents functions to exactly determine a balance point.

Figure 5:
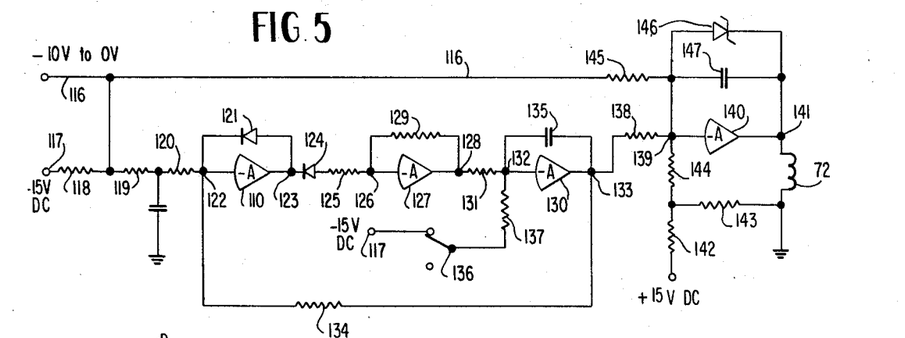
FIG. 5 is a schematic diagram of a minimum signal detector according to this invention.

To obtain more rapid and accurate analysis, this invention provides a starting and termination point for the integration of signals corresponding to each constituent of the mixture in which the time of beginning and ending of elution of such constituent is not known in advance. Such a circuit as illustrated in FIG. 5 has proven satisfactory and permits accurate separation of constituents within approximately 1% error, even though the chromatograph voltage output decreases by only about 20% between two adjacent peaks. For the purpose of illustration, it will be assumed that the output from the differential amplifier is negative and varies from zero to —10 v. Lead 116 receives this negative voltage in proportion to the output of the differential amplifier. The voltage source 117, for example, —15 v. D.C., is supplied by way of resistor 118 in series with resistor 119 through an operational amplifier 110, preferably by way of a further resistor 120, which may be stabilized with respect to ground by a filter capacitor as shown. Lead 116 connects to the junction of resistors 118 and 119. Operational amplifier 110 thus has input from resistor 120 and an output at the opposite end thereof, to which is connected the anode of a diode 121 of which the cathode is connected to the junction of resistor 120 and the input of amplifier 110, indicated at 122. At the junction 123 of the output of 110 with diode 121 is connected the cathode of a further diode 124, the anode of which is connected through a resistor 125 to an input terminal 126 for operational amplifier 127 having output terminal 128 and a feedback resistor 129 connected between terminals 126 and 128. A further operational amplifier 130 is connected to terminal 128 by coupling resistor 131 at input terminal 132 and has an output terminal 133 to which is connected an overall feedback resistor 134, the other end of which is connected to terminal 122 at the input to amplifier 110. A storage capacitor 135 also connects between terminals 133 and 132 to provide a voltage storage means for the output from amplifier 130. Switch 136 provides means for connecting reference voltage source 117 to the input terminal 132 for amplifier 130 by way of resistor 137.

As hereinbefore noted, reference voltage is applied for the reset condition of the signal minimum detector during each resetting operation which should occur whenever a shift is made from one to another of the streams being analyzed and within one of the streams being analyzed for shifts from one component totalizer to the next. For an understanding of the operation of the minimum detector, it is to be noted that switch 136 is closed to effect resetting and is opened whenever it is desired to search for a signal minimum. The output terminal 133 is connected by way of resistor 138 to a junction 139 and thence to operational amplifier 140 which has an output terminal 141 connecting operating voltage to relay 72, the opposite side of which is preferably grounded.

It is also desirable to use a resistive network comprising a voltage divider including resistors 142 and 143 connected to a suitable voltage supply and to ground to provide voltage at the junction of these two resistors such as +.15 volts. This junction is connected by way of resistor 144 to input junction 139 whereby junction 139 is statically biased to a small positive voltage requiring a small but definite rise in signal before actuating the detector, for reasons as will hereinafter appear.

Lead 116 connects to junction 139 by way of resistor 145. When resistors 138 and 145 are equal in value, it will be apparent that the input terminal 139 has thereon a voltage which is proportionally related to the negative input voltage on line 116 and to the output voltage at terminal 133. In the static condition with no voltage applied to lead 116 a slight positive voltage exists at 139 as noted. Whenever the sum of the voltages applied to resistor 138 and resistor 145 is negative enough to overcome the positive voltage at resistor 139 it will be evident that the input voltage to amplifier 140 becomes negative and produces a positive output at terminal 141. Zener diode 146 is connected at terminals 139 and 141 in a direction to prevent feedback of positive output voltages to terminal 139 developed as a result of negative input. Negative output voltage at 141 beyond a fraction of a volt is prevented while positive output voltage generated at terminal 141 is limited to approximately 10 volts by the action of diode 146.

Condenser 147 is connected across amplifier 140 primarily for the purpose of filtering out transients and high frequency noise so as to stabilize the operation of the amplifier. A relay coil at 72 controls power to a stepping switch indicated at SS1. Contacts controlled by relay 72 connect a 24 volt D.C. power supply to the wiper of SS1C which controls the switching mechanism determining on which integrator the signal being received is to be stored. Also, upon actuation of relay 72, the signal coming in on lead 116 is interrupted to terminate the action of the minimum detector circuit.

From the foregoing description, it may be seen that the minimum signal detector operates in the following manner. When a varying D.C. signal containing the instantaneous output from the bridge is applied at line 116 by way of a differential amplifier, this signal is passed through the control switch contacts as a varying signal from a low impedance source such that the operations performed in the minimum detector do not reflect back to alter this signal voltage output. Negative reference voltage applied at 117 by way of resistor 118 is overcome by voltage applied through lead 116 to resistor 119 and the signal voltage via 116 controls the subsequent operation both at terminals 132 and 139. At the same time, a relay opens switch 136 to remove the negative voltage supply at 117 from control of amplifier 130 through terminal 132. Thereupon amplifier 130 very rapidly adjusts to a positive output voltage equal in magnitude to the negative voltage supplied in lead 116. When the circuit consisting of amplifiers 110, 127 and 130 is driven in a positive direction, i.e., from a more negative to a less negative voltage, diode 124 conducts thereby causing amplifiers 110, 127 and 130 to act as a single amplifier fed through series resistors 119 and 120, and with a feedback path through resistor 134 to cause the output to exactly follow the input voltage at 116. As the input signal decreases in magnitude, i.e., from more negative to less negative, the combined three amplifier circuit and feedback operates as a simple inverter and produces an output voltage at terminal 133 of like magnitude to the input voltage at 116.

When the input signal reaches a minimum and commences to increase to a more negative value, diode 124 can no longer conduct and the three amplifiers thereafter operate separately, the overall feedback group being broken. At this point diode 121 provides feedback for amplifier 110 to keep its output at a small positive voltage while the input signal is increasing, thus preventing circuit overload. Amplifier 127 has a zero output at this time and amplifier 130 serves as a memory circuit by virtue of capacitor 135 which accumulated the signal output from amplifier 127. Thus the output from amplifier 130 is caused to hold in voltage at the smallest signal voltage attained during the decrease in magnitude of the signal on lead 116.

The circuit thus described is seen to follow the input signal whenever it is decreasing and to produce an output immediately upon an incremental increase in input signal strength, which output signal terminates the operation of the minimum signal detector as previously described to reclose switch 136 and re-establish the reset condition for the minimum signal detector circuit. For use in certain processes it is preferable to permit cycle timer 75 to commence the searching action of the minimum detector and to resume cyclic control until a little before the next minimum is to be found.

It may be noted that the algebraic sum of the voltages in resistors 138 and 145 becomes negative when an increasing signal is applied at 116 and that Zener diode 146 then conducts only upon breakdown, and for positive voltage input conducts in the forward direction to hold the amplifier 140 at essentially zero output. When the algebraic sum of the voltages on resistors 138 and 145 is negative, the output of amplifier 140 is limited by the Zener diode 146 to 10 volts, which is ample for operation of relay 72. Relay operation is adjustable but may occur on a rise of input signal of as little as .001 volt.

In the discussion of the operation of circuits 30 and 50, it is assumed that the amplifiers are of the types shown in FIGS. 3 and 4. When the feedback path is resistive as in FIG. 3, a simple operational amplifier results. When this is fed by way of a series input resistor a signal inverter is obtained. If a capacitor is placed across the amplifier this capacitor is chargeable at a fixed rate. If the capacitor substitutes for the feedback resistive path there results an integrator, as in FIG. 4. When a diode substitutes for the resistive feedback path, as in circuit 30 and amplifier 140, a voltage amplifier and rectifier results and the output is responsive selectively to the desired direction of input signal change from a prior value. The amplification contemplated in such amplifiers is of the order of $10^8$ but may be as low as 1000. In any chosen amplification it is to be noted that the operational amplifier behaves more as a current amplifier than as a voltage amplifier, because of the extreme amplification with sufficient feedback to tie the output voltage almost exactly to the inverse of the input voltage, except when modified to include either the capacitor as an integrator, as in circuits 21–25 or 130 and 135, or to include diodes, as in circuit 30 and outputs 140 and 146. Used as an integrator the input current may be a fixed ratio of $E/R$ by selection of an input resistor.

Control of component storing cycles during each stream analysis requires some further explanation, as does the switching operation following each minimum signal detection. Switch SS1C has lead 110 extending to switch 111 and then by lead 116 to the minimum detector circuit 50, previously described. Switches 112, 113, 114 and 115 similarly connect to successive terminals of SS1C for providing at lead 116 a signal corresponding at each instant to the signal in line 16. Switches 111–115 are controlled in a consequence of operations of SS1 actuation coil 102 to provide selection and separate integration of signals corresponding to the portions or constituents of the fluid mixture being analyzed.

It may be noted that switches $Re_1$–$Re_5$ are under control of cycle timer 75 to provide maximum periods during which portions of the cycle may operate for the storage of the signal on integrators 21–24. It frequently happens during an analysis that one component is not present, as when the particular stream being analysed does not yet contain that component. Since the same recorder apparatus must analyze and record all components of interest for each of the several streams wherein the volume or concentration varies over wide ranges from zero, it will be appreciated that the minimum detector circuit cannot be employed to step SS1 from one position to another except when a minimum is detected to give an output via relay 72. Cycle timer 75 provides a maximum interval during which each of the components is to be searched by the minimum signal detector circuit. Whenever a reversal from decreasing signal magnitude to increasing signal magnitude occurs, an output from detector 50 passes to relay coil 72 which in turn operates switch 73 to connect power by way of diode 74 to SS1 actuation coil 102. Operation of SS1, whether from relay 72 or timer 75, steps the wiper along from one position to the next sequential position. It will be understood that SS1 may also be actuated by manual control, or by automatic means to recycle from the final position utilized to the zero position under control of timer 75, or otherwise.

Assuming that SS1C is on the first position and that cycle timer 75 has closed switch S1 relay $Re_1$ will be actuated to close switch 111, 76 and 86. This provides the before-mentioned connection for amplifier 14 to the minimum detector circuit via lead 116. At the same time, relay voltage at 55 is applied by way of contacts 86 and 76 to charge capacitor 81. It will be noted that each of the circuits comprising $Re_1$, $Re_2$, $Re_3$, $Re_4$ and $Re_5$ is similarly connected under control of switches $S_1$, $S_2$, $S_3$, $S_4$ and $S_5$. By this means, lead 16 is connected to lead 116 in succession through the SS1 contacts corresponding to the component being integrated. Similarly, capacitors 81, 82, 83, 84 and 85 are charged via contacts 76–80 and 86–90, depending upon the position of the wiper arm of SS1 and ultimately dischargeable via 91–95. Whenever no minimum is detected by detector 50 prior to the next interval under control of cycle timer 75, the appropriately connected one of relays $Re_1$–$Re_5$ drops out thereby to connect charged capacitors 81–85 through diodes D1–D5 and leads 96–100 to circuit 101 for direct actuation of coil 102. In the event no minimum is detected and no operation is provided through relay 72, the charges on capacitors 81–85 are effective to provide one additional step depending upon the position of SS1D. However, no further step will occur since stepper deck SS1D connects respectively to leads 96–100 thereby preventing a step due to the charged capacitors if the automatic circuit 50 has produced a step during the switch S1–S5 actuator time.

While sequence timer 18 provides directly any desired portion of the readout such as control of motor 40, optionally governing switch 46, etc., cycle timer 75 preferably supplies contact means for initiating a readout sequence, first by operating switch 46, and then by suitable actuation of switch 104 and circuit 103, after which coil 56 is actuated by switch 51. Switch 104 is thus controlled by timer 75 to cause readout (although timer 18 could be considered to include cycle termination and readout controls herein regarded as part of cycle timer 75) it being desired that the standardization cycle governed by 30 be effected at the end of each SS1 cycle, followed by readout and resetting of cycle timer 75. Operation in this manner preferably includes means to avoid operation of switch 104, by activating well-known enabling circuit means, until such time as the final component of the stream to be analyzed has its signal stored in amplifier 25 and until the voltage comparison and signal attenuation is completed in a signal standardization circuit although motor 40 could be started earlier by timer 75 and additional cammed switches could operate the standardization and attenuation circuitry at 46, 51 and 56. Also controlled from motor 40 is a recorder control cam switch 105 and a suitable multipole switch 106 for connecting the recorder to the stream identity selector circuit and the bar generator circuit via lead 107, in suitably timed sequence, as illustrated in FIG. 6a.

Referring now to FIG. 6, it will be noted that stream component curves derived from the output of differential amplifier 14 are shown at 108, 109, and 110. Curve 108 represents a stream in which a very high concentration of light materials is eluted as illustrated by the relative amplitudes of the curves at positions A, B, C and D. Curve 109 represents a sample of approximately the same size in which light components are nearly absent and heavy components are in abundance as shown in the regions A, B, C and D. The solid curve at 110 illustrates an analysis of a stream having the same four components present in roughly equal amounts. It may be observed that the concentration of a particular component of a mix has considerable influence on elution time required for the signal to rise and decay to zero. It will also be apparent that no predetermined allocation of time would be effective for resolving the four constituents of the mix illustrated in the three curves of FIG. 6 since elution time depends on the quantity of each constituent present in the sample. When these variations exist within the same process at different stages to be recorded by a single chromatograph, it will be apparent that resolution could not be obtained without greatly extending the time except by use of a component detector. It will also be evident that peak height is not a reliable measure of a quantity of a particular component especially where more than one peak is involved in the same component as in the case of various isomers.

FIG. 6a illustrates a bar presentation of the output from three streams showing the different concentrations of the several components indicated by three markers 151, 152 and 153. In the time interval following marker 151, constituents A and B are very nearly absent, whereas C and D are large. Following marker 152, constituent A is large and B is relatively small, while C and D are absent. Following marker 153, constituents A, B and C are of moderate size, whereas the component D is small. These are not necessarily the order or magnitudes involved in a particular process but are illustrative of the great variation between streams to be analyzed and used in control of a commercial manufacturing process.

Figure 7:
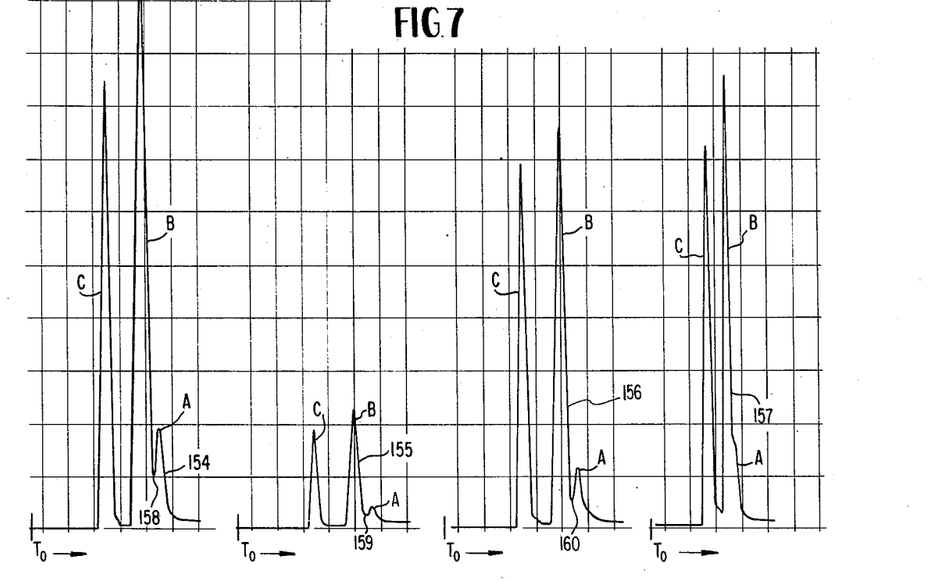
FIG. 7 shows like scale test results for three sample sizes at one elution rate and a different elution rate for identical mix of material of one stream.

FIG. 7 illustrates the effect of varying sample size wherein the identical composition was analyzed in different sample sizes. Curve 154 shows a sample of a given size in which components A, B and C are eluted in a period of about two and one-half minutes. Curve 155 shows a like elution time with a smaller sample, and curve 156 is of an intermediate size sample, in all of which components B and C would be separated by conventional apparatus depending on peak height or controlled time for integration. However, in each of these cases components A and B are not separated by conventional means but are separated by use of the minimum signal detector of the present invention wherein the periods of integration are determined at points 158, 159 and 160. Curve 157 illustrates an elution period of about 1.5 minutes in which components A and B cannot be separated. It may be noted that the minimum signal detector technique of this invention successfully separates signals corresponding to the separate components with an accuracy of approximately one percent when the sample size varies over a range of 50%, provided the signal minimum represents a change approximating 20%.

Figure 8:
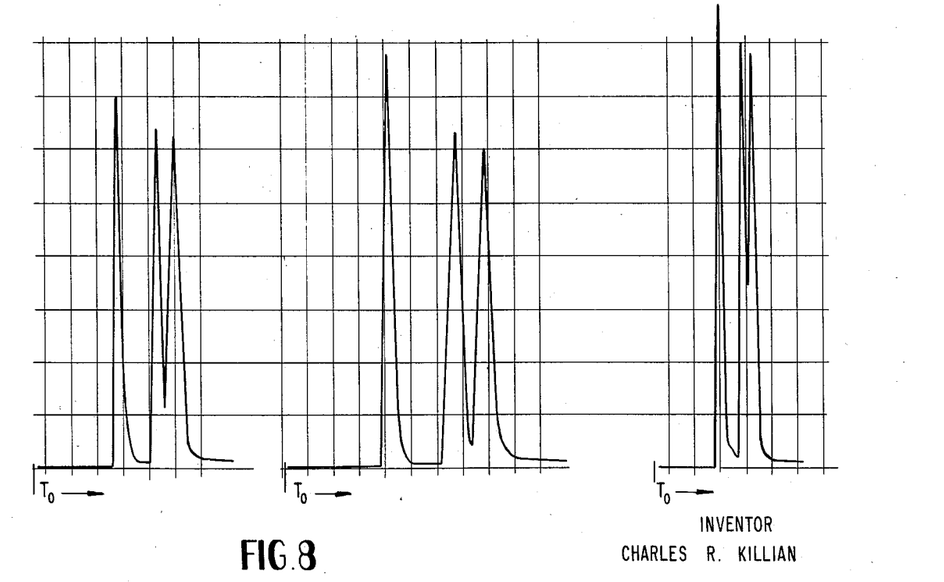
FIG. 8 illustrates the result of analyzing the same size sample of material at three different elution rates.

FIG. 8 further illustrates the effect of changing elution time for three components of a mixture differing somewhat from that of FIG. 7 in relative concentration. Elution periods are respectively 1.5, 2.3 and 3 minutes. Particularly when the minimums are sharp, as in these cases, predetermined switching times as a means of separating components cannot provide an accurate measurement of the relative composition of the mixture, and the previous means of analysis is by extending the time beyond reasonable limits for process control surveillance. It should be noted that peak height would not be an accurate measurement either in FIG. 7 or FIG. 8, and that resolution is obtained in these cases by the use of attenuation to a standard total sample signal and by the use of the sample size standardization circuit 30 of FIG. 2.

The apparatus herein described thus provides automatic means for determining the nearly complete elution of one component of a mixture in a chromatograph column without waiting for the signal to decrease to zero, and provides an accurate measurement of the total integral for a component even though the sample size has varied from sample to sample and from stream to stream. These advantages are retained even though relative composition varies by a factor of 100 to 1, since the several integrators may be integrated and readout according to a proportional scale adjustable separately for each integrator while at the same time maintaining the advantage of separation between components with respect to the signal therefrom by means of the minimum signal detector circuit. Also to be noted is the fact that isomers of the same compound may be resolved without sufficient elution time to fully separate them and without so crowding them together that all isomers appear as a single peak of a curve.

Furthermore, by providing automatic timing and sequencing of the search for each component in a mixture, it is possible to present pictures or graphs of the resulting peaks in rapid succession and to indicate accurately the results even though the time of beginning and the time ending for each may vary from sample to sample or from stream to stream, the result of the analysis being displayed in a readout device wherein all signals to be readout corresponding to any particular sample are retained in the integrators and readout in rapid succession following the completion of the analysis and the reduction of these integrated signals to a standardized proportion with respect to the total signal integral from the sample as analyzed.

While the invention has been described and illustrated in a preferred embodiment of my invention, I wish it to be understood that I do not intend to be restricted solely thereto, but that I do intend to cover all modifications which would be apparent to one skilled in the art.

What is claimed is:

1. In a chromatographic component signal separation circuit,
   low impedance source means providing a variable electrical signal of a first polarity varying in magnitude in response to variations in eluted components of a fluid mixture,
   multichannel means including in each channel an integrator circuit for storing the cumulative total of said signal applied thereto,
   means connecting said source means successively to said integrator circuits,
   means connected to said source means for detecting an incremental increase in magnitude of said first polarity signal after a decrease therein and thereupon generating an output signal,
   means responsive to said output signal for operating said connecting means to shift said electrical signal to a different said integrator circuit upon said detection of an increase,
   signaling means to provide indication of completion of a signal storage after said signal has been successively shifted to each of said integrator circuits, and
   means responsive to said indication for connecting said integrator circuits successively for readout of said cumulative totals.

2. In a circuit according to claim 1, said detector including three operational amplifiers connected to follow decreasing input voltages without substantial change of output voltage and to provide output voltage operative for shifting said signal when input voltage thereto increases incrementally.

3. In a circuit according to claim 1, said means connecting for readout including means for attenuating said stored voltage on each said integrator at like attenuation rates for a time responsive to magnitude of voltage stored in one said integrator.

4. Chromatograph apparatus providing a signal of one polarity representing at each instant the quantity of eluted product and including signal separation for a plurality of products each represented in a readout for each cycle of operation, comprising
   multichannel means providing in each channel a stored voltage integral corresponding to the magnitude and duration of signal of one polarity applied thereto,
   timed switch means passing a portion of said signal during one cycle in succession to each of a plurality of said channels,
   means supplying a portion of said signal throughout said cycle to another of said channels to store a variable total signal integral proportional to product eluted over one complete cycle,
   timing means determining the beginning and ending of each said cycle,
   means operative after each said cycle responsive to said timing means for causing stored signal attenuation at a predetermined rate, comprising
   a source of reference current of predetermined magnitude,
   means representing said variable signal as a current in opposition to said reference current,
   means effective to detect equality between said currents and to thereupon terminate said attenuation, and
   means in each of said plurality of channels responsive to said means causing signal attenuation to similarly attenuate therein said voltage integral at said rate.

5. Apparatus according to claim 4, said means for causing stored signal attenuation comprising a comparison circuit, a resistor connected to a fixed potential of one sign as an input to said circuit, a second resistor connected to said circuit as a second input of opposite sign derived from said variable total signal integral, and means responsive to a decrease in the value of said second input to produce an output at the time said second input falls below said first input.

6. Apparatus according to claim 4, said means for causing stored signal attenuation including an operational amplifier in parallel with a diode poled to produce an amplifier output signal of one sign whenever the difference in current from said source and said variable total signal integral changes sign.

7. Apparatus according to claim 4, said means in each channel comprising a high gain direct-coupled amplifier having connected in parallel therewith a capacitor and a discharge circuit including switch means in series with a load, said switch being closed during said attenuation of voltage integrals and open upon termination thereof.

8. In a chromatographic signal recording device for fluid mixtures in multiple streams passed successively through a separation column,
   means generating a signal indicative of successive elution products from each said stream instantly connected to said column,
   sequence timing means connecting said streams in succession to said column,
   cycle timing means operative during the connection of each stream to said column for controlling intervals comprehending elution termination times for particular components of fluid mixture in said column,
   plural integrating means connected to separately sum the generated signal during successive periods of each cycle corresponding to approximate elution times for each of a plurality of components in said column,
   means operative in response to occurrence of a minimum value of said signal at the instant of each said elution termination for shifting from one said integrating means to another thereof to control the beginning and ending times for signal integration, means operative at the termination of each cycle for reducing said integrals to a value corresponding to a standard sample size and condition, means operative at the completion of said signal reduction for causing readout in succession of each said summed signal, and means operative after said readout for erasing said summed signal and advancing said sequence and cycle timing means to a succeeding connection.

9. In a recording device according to claim 8, means including a moving chart recorder connected for recording said readout of summed signals in sequential order following termination of said sequence during which said signals are summed, and means generating a chart mark individual to each said stream at the time of readout of said summed signals.

10. A method of recording signals developed from successive elution of components of a fluid sample passed through a chromatographic column, comprising developing a DC voltage signal of amplitude representative of the eluted product from said column, integrating in a plurality of separate channels said voltage signal during successive intervals within a sample elution period, said intervals of integration in each channel being timed to roughly approximate the time of elution of a particular said component, detecting the occurrence of a minimum amplitude in said voltage signal occurring near the termination of one said interval and the commencement of the following interval as a change from a diminishing said DC voltage signal to an increasing said voltage signal, employing said detected occurrence to cause termination of integration of voltage in one said channel and commencement of integration of voltage in a successive said channel, and recording signals proportional to the voltages as integrated in said channels as quantitative indicators of the components eluted.

11. The method as in claim 10 including the further steps of generating a marker signal individual to each said channel and recording said marker signal in association with the recording of said quantitative indicators.

12. The method of recording chromatographic integrated signals developed from an elution column as components of a fluid sample are passed therethrough, comprising developing an electrical signal representative of eluted components during a period of rate-controlled elution of a sample in which overlapping elution times for components may occur, cumulatively storing during a first interval said signal representative of one component of said sample, separately storing during successive further intervals within said period said signal representative of other said components, detecting a minimum amplitude of said signal between adjacently eluted components, developing a further signal from a detected minimum amplitude of signal, employing said further signal to precisely terminate storing of signal representative of one component and to commence storing of signal representative of the following component, and recording separately said stored signals to indicate quantitatively each component eluted in said period.

13. The method of claim 12 including further steps of storing a signal representative of the cumulative total of components eluted, reducing the stored signal portions of each said interval by a factor derived from the signal representing the total sample to provide scale correction for said signal portions, and recording said reduced signal portions after said period has pased and said corrections are effected.

14. A method of separately recording integrated chromatographic output signals to represent quantitatively components in a sample of fluid eluted during overlapping intervals varying in time with said quantity, comprising the steps of adjusting a carrier gas flow to produce substantially separated but overlapping elution times for said components, developing a DC output signal quantitatively proportional to the fluid instantly being eluted, integratively storing said signal during successive intervals in storage channels individual to the components to be recorded, timing the maximum storing interval in each channel to approximate the maximum elution time for that component under a predetermined range of sample variations, detecting the moment prior to the end of said storing interval at which said signal begins to rise as a succeeding component is eluted, and connecting said signal to successively different said channels as said moments are detected thereby to effect integration in each channel over a time governed by detected signal minimum values.

15. A device for signaling the occurrence of a minimum amplitude in a varying voltage signal of predetermined polarity from a low impedance source, comprising operational amplifier means connected to said source for inverting the polarity of said signal during an interval of decrease in magnitude thereof including therein initially charged storage means connected to said source to follow changes in said signal amplitude during decreases therein and to hold therein stored signals during increases of said magnitude, said amplifier means including a plurality of stages and polarity-distinguishing coupling therein for producing negligible output during intervals of decreasing signal magnitude and substantial output voltage upon occurrence of an increase in said signal magnitude, and means producing an output pulse responsive to said substantial output voltage for indicating occurrence of a said increase of signal.

16. A device according to claim 15, wherein said amplifier means includes means producing a self-biasing voltage in control of conduction therein during periods of decreasing input from said source to proportionally discharge said storage means, and decoupling means for causing said varying signal to override said biasing voltage in response to an increase in said signal and for causing the charge on said storage means to trigger said output pulse.

17. A device according to claim 15 including means actuated in response to said output voltage for resetting said storage means to a predetermined charge in the absence of said varying signal.

18. A device according to claim 15, said source being a signal detected from a chromatographic column and said output pulse being connected for intermittently switching output from said source to said amplifier means.

19. A device according to claim 15, said amplifier means comprising three series connected operational amplifiers connected in an overall feedback loop, a first amplifier having a unidirectional feedback loop therearound limiting output therefrom to voltages of said predetermined polarity, a second operational amplifier being connected to the output of said first amplifier through unidirectional current conducting means, a third operational amplifier being connected to the output of said second amplifier and having a capacitor connected in a feedback loop therearound to form an integrator, said amplifier means serving as a signal inverter during decreases in magnitude of said varying signal and said integrator storing a minimum voltage during increases in said magnitude.

20. A device according to claim 15, said amplifier means comprising a first operational amplifier overridably biased for positive voltage output but having low resistance feedback preventing said positive output, a second operational amplifier connected by diode means to the output of the first amplifier poled to respond only to negative voltage output, a third operational amplifier conected to the output of the second amplifier and having a capacitor thereacross to form a storage circuit, a resistive negative feedback path from the output of the third amplifier to the input of the first amplifier, causing said three amplifiers to operate as a voltage inverter when said varying signal is decreasing, said diode means preventing said feedback during increases in said varying signal, said device further including input means fixedly biasing said amplifier means to produce a fixed initial charge on said storage means and resistively connectable to said low impedance means for overriding the fixed bias during selected intervals including possible occurrence of said minimum point.

21. A detector for providing an output signal responsive to occurrence of a minimum in a signal varying from 0 to a predetermined maximum amplitude of one polarity, comprising means providing a bias voltage exceeding said maximum voltage at higher source impedance than said signal, a first high gain amplifier connected to receive said bias voltage as input when said signal is not applied and to receive as input the voltage of said signal when applied, means applying said signal to said amplifier during intervals when said detector is in operation, a second high gain amplifier responsive to said first amplifier and having an output voltage of the polarity of said signal applied to said first amplifier during one direction of signal change, unidirectional coupling means reducing output from said amplifiers to 0 during signal changes opposite said one direction, a third high gain amplifier having storage means connected at input and output connections thereto, said input connection being supplied with output from said second amplifier and from a further biasing voltage of the sign of said bias voltage during intervals when said detector is not in operation, and feedback means connected to said output of said third amplifier and to the input of said first amplifier for cause combined amplifier output to follow said signal during decreases therein, said coupling means being operative to prevent following said signal during increases of input signal.

22. A detector according to claim 21 further comprising a polarity-sensitive output signal amplifier connected to respond to said varying signal and to said output signal whenever said output signal bears a predetermined relationship to said varying signal.

23. A detector according to claim 21, further comprising an operational amplifier connected for response to the larger of two input signals, one being derived from said output signal and the other from said varying signal, said response being polarity-sensitive to provide an indication for one polarity of difference between said signals.

References Cited

UNITED STATES PATENTS

| | | | |
|---|---|---|---|
| 3,242,327 | 3/1966 | Burk et al. | 235—151.35 |
| 3,281,686 | 10/1966 | Cochran | 307—235 |
| 3,299,693 | 1/1967 | Kieselbach | 73—23.1 |

MALCOLM A. MORRISON, Primary Examiner

F. D. GRUBER, Assistant Examiner

U.S. Cl. X.R.

73—23.1; 235—151.35; 307—235; 328—132, 142